No. 751,172.

Patented February 2, 1904.

UNITED STATES PATENT OFFICE.

GEORGE T. HOWARD, OF LAGRANGE, ILLINOIS, ASSIGNOR OF ONE-HALF TO WILLIAM J. APPLEGATE, OF CHICAGO, ILLINOIS.

ARTIFICIAL FUEL.

SPECIFICATION forming part of Letters Patent No. 751,172, dated February 2, 1904.

Application filed June 17, 1903. Serial No. 161,846. (No specimens.)

*To all whom it may concern:*

Be it known that I, GEORGE T. HOWARD, a citizen of the United States, residing at Lagrange, in the county of Cook and State of Illinois, have invented new and useful Improvements in Artificial Fuel, of which the following is a specification.

This invention relates to artificial fuel and the manufacture thereof, and has for its object to provide a commercial article of this character that may be largely substituted for the natural product.

A further object is to produce an artificial fuel that will not disintegrate under the action of atmospheric changes and will ordinarily retain its original form imparted in the operation of molding or pressing the same into briquets of suitable commercial proportions.

Another object is to so compound and mechanically unite the different ingredients into one homogeneous mass that the briquets will not break up into small particles, but will be gradually consumed in their entirety, thus increasing the lasting and economical qualities.

The ingredients employed in the composition are loam or other suitable earthy matter, coal-screenings—that is, the fine waste that is usually found in the dumps around mines—sawdust, petroleum, oil-meal, paraffin, milk of lime, solution of glue, and tar.

In the preparation of the composition, taking one hundred parts as a basis, the proportion of the ingredients given is as follows: loam, fifty-five parts; coal-screenings, twenty-five parts; sawdust, five parts; petroleum, three parts; oil-meal, three parts; paraffin, one part; milk of lime, three parts; solution of glue, one part, and tar four parts.

It will be obvious that of the above composition loam constitutes about one-half, while dry comminuted fuel, such as coal-screenings and sawdust, constitutes about thirty one-hundredths—that is to say, between one-third and one-fourth—the remainder of the one hundred parts being divided between oily material, such as paraffin, oil-meal, and tar; alkaline material, such as milk of lime, and adhesive material, such as glue and tar. Of course a mathematically-exact definition is not always possible in such a case, as some oily matters may be more or less adhesive, and some very adhesive matters, such as tar, are more or less oily; but the preponderating characteristics will prevent any misunderstanding, especially as a slight difference in proportion will not affect the identity of my composition, so that it matters little whether a small quantity of one ingredient be considered as belonging under one head or the other.

The process followed in compounding is to take the first three ingredients—the earthy matter, the coal-screenings, and the sawdust—and thoroughly mix the same together. The next three ingredients—petroleum, oil-meal, and paraffin—are then mixed together and heated to a degree that will make the admixture complete, which is then added to the three first compounded ingredients and thoroughly agitated and worked together. The milk of lime is added next, then the solution of glue, and finally the tar is added in a heated state and the whole worked together until the chemical admixture is complete and the mass assumes a granular form, when it is in proper condition to be molded or compressed into commercial briquets.

The tar is the principal binding element, which, together with the glue matter, makes a perfect binder and supplies the necessary cohesive qualities to prevent disintegration of the mass as a whole or the fractional parts thereof.

The earthy matter constitutes the body of the brick, the comminuted dry fuel and oily materials supply material for combustion, the alkaline material acts as a hardener for the oily material, and the adhesive materials, aided in some degree by the oily materials thus heated, bind the brick together.

This fuel, the product of the composition set forth, burns very gradually, produces but little smoke, and gives out an intense heat like unto that of the better grades of anthracite coal.

Having thus described my invention, what I claim, and desire to secure by Letters Patent, is—

1. A composition for artificial fuel consisting of the following ingredients in substantially the proportions stated: loam fifty-five parts, coal-screenings twenty-five parts, sawdust five parts, petroleum three parts, oil-meal three parts, paraffin one part, milk of lime three parts, solution of glue one part and tar four parts, as set forth.

2. A composition for artificial fuel about one-half of which is loam, from one-fourth to one-third dry comminuted fuel and the remainder divided between oily material, adhesive material and hardening material, substantially as set forth.

3. The process of making briquets of fuel which consists in mixing mineral and vegetable oily matter and heating the same; then mixing this mixture with a mixture of comminuted fuel and earthy matter; then adding hardening alkaline material and binding material and finally molding the mass into briquets substantially as set forth.

In testimony whereof I have signed my name to this specification in the presence of two subscribing witnesses.

GEORGE T. HOWARD.

Witnesses:
L. M. FREEMAN,
L. B. COUPLAND.